(12) United States Patent
Bhuruth

(10) Patent No.: US 10,685,679 B1
(45) Date of Patent: Jun. 16, 2020

(54) SYSTEM AND METHOD OF DETERMINING A VIRTUAL CAMERA PATH

(71) Applicant: CANON KABUSHIKI KAISHA, Tokyo (JP)

(72) Inventor: Berty Jacques Alain Bhuruth, Bankstown (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/201,812

(22) Filed: Nov. 27, 2018

(51) Int. Cl.
G11B 27/34 (2006.01)
G11B 27/036 (2006.01)
H04N 9/87 (2006.01)
G06T 15/20 (2011.01)

(52) U.S. Cl.
CPC ............ *G11B 27/036* (2013.01); *G06T 15/20* (2013.01); *G11B 27/34* (2013.01); *H04N 9/8715* (2013.01); *G06T 2200/24* (2013.01)

(58) Field of Classification Search
None
See application file for complete search history.

(56) References Cited

U.S. PATENT DOCUMENTS

| 5,977,978 A | 11/1999 | Carey |
| 2007/0211149 A1 | 9/2007 | Burtnyk |
| 2012/0098925 A1 | 4/2012 | Dasher et al. |
| 2016/0171335 A1* | 6/2016 | Aguilera Perez .... H04N 13/221 382/285 |
| 2017/0200277 A1* | 7/2017 | Keat ........................ G06T 7/248 |
| 2018/0029706 A1* | 2/2018 | Baruch .................. H04W 76/14 |
| 2018/0091747 A1* | 3/2018 | Rhee ........................ G01S 3/784 |
| 2018/0197324 A1 | 7/2018 | Hanamoto |

FOREIGN PATENT DOCUMENTS

WO    2017204172 A1    11/2017

OTHER PUBLICATIONS

Illustrator art brush, Adobe CC 2018.1 (22.1.0), Mar. 2018.

* cited by examiner

*Primary Examiner* — Eileen M Adams
(74) *Attorney, Agent, or Firm* — Canon U.S.A., Inc. IP Division

(57) ABSTRACT

A computer-implemented system and method of determining a virtual camera path. The method comprises determining an action path in video data of a scene, wherein the action path includes at least two points, each of the two points defining a three-dimensional position and a time in the video data; and selecting a template for a virtual camera path, the template camera path including information defining a template camera path with respect to an associated template focus path. The method further comprises aligning the template focus path with the determined action path in the scene and transforming the template camera path based on the alignment to determine the virtual camera path.

19 Claims, 12 Drawing Sheets

SYSTEM AND METHOD OF DETERMINING A VIRTUAL CAMERA PATH

TECHNICAL FIELD

The present invention relates to a system and method for determining a virtual camera path, in particular for inserting a virtual camera path template into a virtual environment and extracting a virtual camera path template from a virtual environment. The present invention also relates to a computer readable medium and apparatus for determining a virtual camera path.

BACKGROUND

Real time navigation of a virtual camera can be difficult and present technical challenges. A user controlling a virtual camera is typically capable of moving the virtual camera in six (6) degrees of freedom while also changing zoom settings. In some applications the user may also be required to follow a target object or focus on an event in a scene captured by the virtual camera. The target object may be a player running on a field in a sports application for example. The user controlling the virtual camera needs to be skilled in camera navigation in order to produce a visually compelling recording of an event. To become skilled in producing visually compelling video recordings of the event requires training and familiarity with the camera navigation control system as well as creativity in knowing where and when to position the virtual camera.

In the broadcasting industry, particularly for live sports broadcasting, a typical aim is to produce a replay of an event and achieve the replay in the quickest amount of time possible. The requirement for quickly generating a replay puts a high demand upon the user (operator) whose task is to produce these replays. As a result, there may only be a limited number of individuals with the necessary camera navigation skills to perform the replay task in the required time. Some known systems endeavour to reduce the level of operator skill required by use of pre-existing virtual camera paths. However, due to variation between scenes and events, inserting a pre-existing camera path into the scene typically does not result in the event being captured in the desired manner.

One difficulty related to inserting camera paths is, for a camera path to accurately and aesthetically capture an event, an appropriate relationship between the virtual camera's field of view (i.e. the virtual camera's position, orientation, and focal length), and the position of the target object in the scene is required. An appropriate relationship results in the target object being within the field of view of the camera. Replay events are rarely identical, with each event having different target objects, moving in different directions, performing different actions, and at different parts of the scene. In addition, different virtual camera paths are created to capture the different unique events. Inserting a camera path, which had captured one event, to capture another can be unsuccessful in capturing the required events in the scene.

Some known methods endeavour to address the efficiency of producing virtual camera recordings using existing camera paths. One method comprises a user first posing the virtual camera, and then secondly defining multiple parameters specifying how the camera should behave. One of the parameters defines a camera movement type (for example left/right movement, crane movement). The specified camera movement types then affect how the camera moves in relation to the first virtual camera pose. While the method allows the user to pose the camera in relation to a target object, there is little control regarding ensuring the target object is captured as the event progresses.

Another known method utilises a mechanism referred to as a stage. A stage is a pre-authored environment which contains pre-set colours, textures, lighting, camera path, and a drop zone. The drop zone is a 3D volume positioned someplace within the stage where imported objects are placed within. Instead of inserting a camera path into the scene, the camera path is configured to best view the object inserted into the drop zone and the surrounding lighting. While the method using a stage is efficient in quickly utilising existing camera paths (as the paths are already configured into stages), the method is not suitable in the context of live event broadcasting.

SUMMARY

It is an object of the present invention to substantially overcome, or at least ameliorate, at least one disadvantage of present arrangements.

One aspect of the present disclosure provides a computer-implemented method of determining a virtual camera path, said method comprising: determining an action path in video data of a scene, wherein the action path includes at least two points, each of the two points defining a three-dimensional position and a time in the video data; selecting a template for a virtual camera path, the template camera path including information defining a template camera path with respect to an associated template focus path; and aligning the template focus path with the determined action path in the scene and transforming the template camera path based on the alignment to determine the virtual camera path.

According to another aspect, the action path is determined by the user marking a position of a target in the scene for at least two different time values.

According to another aspect, the action path is determined by execution of a tracking algorithm to determine a position of a target in the scene for at least two different time values.

According to another aspect, the action path is defined by more than two points in the scene associated with an object of interest in the scene, and an orientation of the virtual camera along the determined virtual camera path is modified to capture the target.

According to another aspect, transforming the template camera path comprises scaling the template camera path based on the alignment.

According to another aspect, transforming the template camera path comprises modifying orientation of the template camera path based on the alignment.

According to another aspect, the action path is defined by more than two points, each point having a position value and a time value in the video data, the method further comprising determining a speed characteristic of an object of interest in the scene based on the points.

According to another aspect, the action path is defined by more than two points, each point having a position value and a time value in the video data, a speed characteristic of the template focus path is matched to a speed characteristic of the action path, the speed characteristic of the action path being determined from the defining points.

According to another aspect, the timing of the camera along the camera path is adjusted according to the speed characteristic of the template focus path.

According to another aspect, more than two points are defined in the video data, and the action path is defined by the line of best fit between the points.

According to another aspect, the template camera path is associated with the template focus path so that modifications to the template focus path are correspondingly applied to the template camera path.

According to another aspect, the template camera path is selected from a plurality of template camera paths.

According to another aspect, the camera coordinates are defined to capture an object of interest associated with the focus path.

Another aspect of the present disclosure provides a system, comprising: a network of cameras positioned to capture video data of a scene; a memory; a display and a processor, wherein the processor is configured to execute code stored on the memory for implementing a method comprising: reproducing video data of a scene on the display, the video data captured by the network of cameras; receiving, via a graphical user interface, selection of least two points, each of the two points defining a three-dimensional position and a time in the video data, the at least two points defining an action path in the scene; receiving, via the graphical user interface, selection of a template for a virtual camera path, the template camera path including information defining a template camera path with respect to an associated template focus path; and reproducing a virtual camera view along a determined virtual camera path on the display, the virtual camera path determined by aligning the template focus path with the determined action path in the scene and transforming the template camera path based on the alignment.

Another aspect of the present disclosure provides a non-transitory computer readable medium having a computer program stored thereon to implement a method of configuring a path of a virtual camera, said program comprising: code for determining an action path in video data of a scene, wherein the action path includes at least two points, each of the two points defining a three-dimensional position and a time in the video data; code for selecting a template for a virtual camera path, the template camera path including information defining a template camera path with respect to an associated template focus path; and code for aligning the template focus path with the determined action path in the scene and transforming the template camera path based on the alignment to determine the virtual camera path.

Another aspect of the present disclosure provides a computer-implemented method of determining a template camera path, said method comprising: determining camera coordinates defining a camera path in a scene of a video, defining a focus path representing a path of a subject of interest in the scene captured by a virtual camera associated with the camera path; and defining the camera coordinates with respect to the focus path to create the template camera path.

According to another aspect, the focus path is determined based upon user selection of at least two points in the scene.

According to another aspect, the focus path is determined using a tracking algorithm tracking an object of interest in the scene.

According to another aspect, the focus path is determined based upon detection of an event in the scene.

Other aspects are also described.

BRIEF DESCRIPTION OF THE DRAWINGS

One or more embodiments of the invention will now be described with reference to the following drawings, in which.

DETAILED DESCRIPTION INCLUDING BEST MODE

Figure 1:
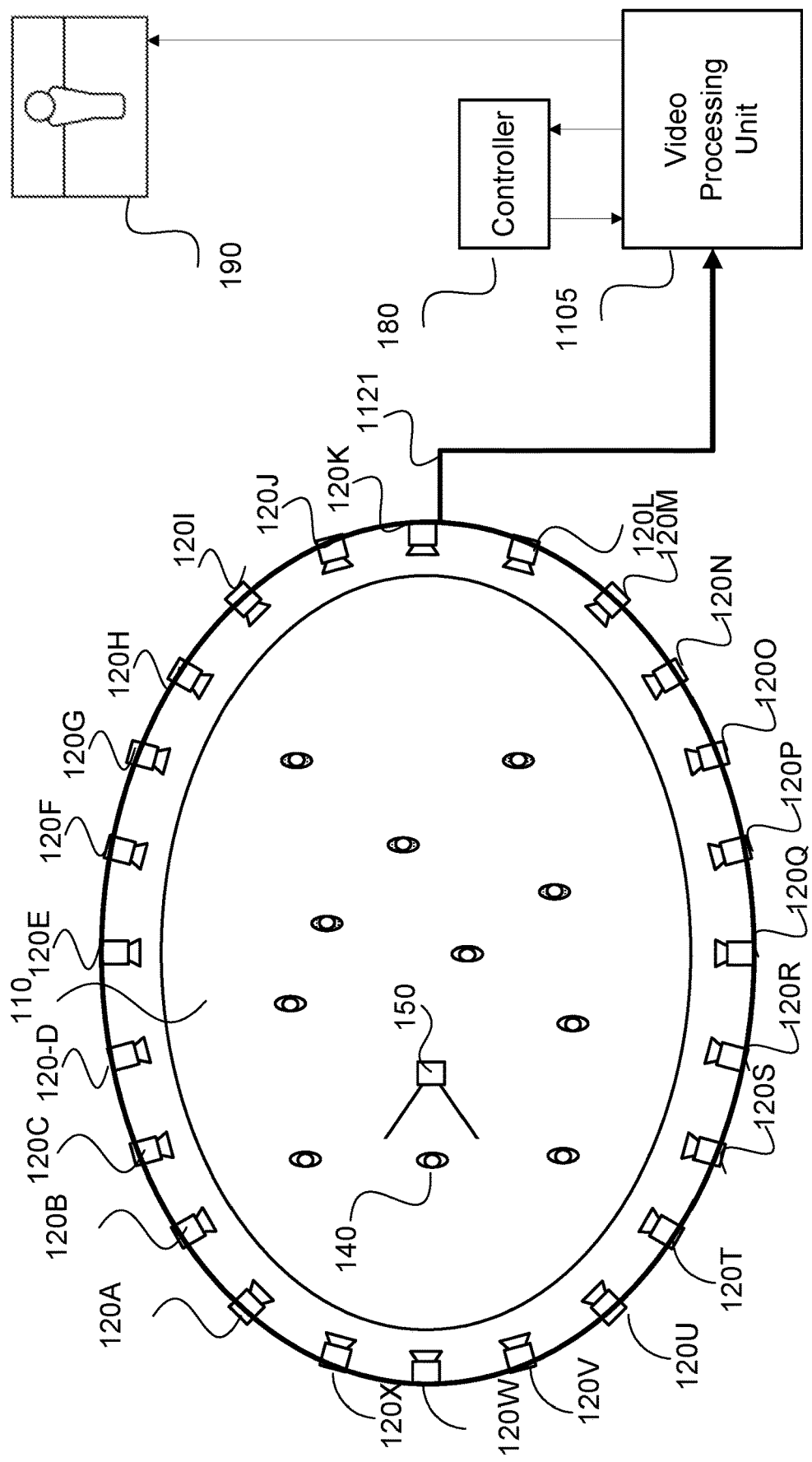
FIG. 1 shows a system of networked video cameras surrounding a sports stadium scene in communication with system to produce a virtual camera perspective from multiple positions and orientations within the sports stadium.

Where reference is made in any one or more of the accompanying drawings to steps and/or features, which have the same reference numerals, those steps and/or features have for the purposes of this description the same function(s) or operation(s), unless the contrary intention appears.

The arrangements relate to an application and method for inserting a virtual camera path template into a virtual environment and extracting a virtual camera path template from a virtual environment. The arrangements described relate to configuring video data relating to a real environment rather than a computer generated environment. While the video data can be described as generating a virtual environment using a virtual camera, the generated virtual environment represents video data of real events. In the context of the present disclosure, video data relates to data representing a three-dimensional scene generated using one or more video frames, each frame captured at a particular time.

As described above, a virtual camera control system would benefit from the user having the ability to insert a pre-existing virtual camera path in order to save time. Inserting a pre-existing camera path allows unskilled or untrained users the ability to utilise camera paths created by more skilled and experienced users.

However, naively inserting an existing camera path into the scene will likely not produce the intended results. For example, often when an existing camera path is inserted into a scene, the path may be inserted according to a default position and a default orientation. In some instances the default insert position and orientation could correspond to the origin-point of the scene. In other instances, the default insert position and orientation could correspond to the original spatial coordinates of the original scene from where the camera path was extracted from. In both instances, the time consuming requirement by the user is they must then further transform the properties of the camera path (position, orientation, scale and timing) to adapt the path to capture the events of the new scene.

In addition, the user is required to further adapt properties of the camera path to ensure the virtual camera is capturing the required target object as it moves through the scene.

Effectively, known techniques typically do not account for speed, timing and how to adapt the camera path as a target object moves. Any time taken to further transform the spatial position or properties of the camera path adds time to produce each replay recording, and in turn, reduces the time gained by inserting the camera path.

The arrangements described herein are intended for use in the context of a sports or similar performance field as exemplified in FIG. 1. A scene or arena 110 is centred on a playing field that is approximately rectangular, oval or circular, allowing the field to be surrounded by one or more rings 120 of cameras 120A to 120X. In the example of FIG. 1 the scene 110 is a field. However, in other arrangements the scene could be a music stage, theatre, public or private venue. The field, in the example of FIG. 1, contains objects such as an object 140. The object 140 could be a person, a ball, a vehicle or any structure relevant to the performance. The scene typically contains a number of different objects. The cameras 120A to 120X are synchronised to acquire frames at the same instants in time so that all points on the field 110 are captured simultaneously from a large number of viewpoints. In some variations, a full ring of cameras is not employed but rather some subsets of the full perimeter are employed.

The video frames captured by the cameras 120A to 120X are subject to processing and temporary storage near the cameras prior to being made available via a network connection 1121 to a computational video processing unit 1105, also referred to as a processor. The computational video processing unit 1105 receives controlling input from a controller 180 that specifies the position, orientation, zoom and possibly other simulated camera features for a virtual camera 150 within the field 110. The role of the computational video processing unit 1105 is to synthesise a specified virtual camera perspective 190 based on the video streams available from the cameras 120A to 120X surrounding the field 110. "Virtual cameras" are referred to as virtual cameras because their functionality is computationally derived by methods such as interpolation between physical cameras or by rendering from a modelled three dimensional scene constructed using data from many cameras surrounding the scene, rather than simply the output of any single physical camera.

A virtual camera location input may be generated by a human virtual camera operator and be based on input from a user interface device such as a joystick, mouse or similar controller including dedicated controllers comprising multiple input components. A controller 180 can provide the user interface device in some implementations. Alternatively, the virtual camera position may be generated fully automatically based on analysis of game play in the field 110. Hybrid control configurations are also possible whereby some aspects of the virtual camera positioning are directed by a human operator and others by an automated algorithm. Examples of hybrid controllers include the case where coarse positioning is performed by a human operator and fine positioning, including stabilisation and path smoothing is performed by the automated algorithm.

The computational video processing unit 1105 achieves frame synthesis using one of known methods for free viewpoint generation. One class of methods relates to model-based methods that reconstruct a full three-dimensional (3D) geometry of the scene 110. A second class relates to depth based methods that use depth estimation and then generate free viewpoint video from image and depth data. A third class relates to image-based methods that use some kind of interpolation of image data to form the free viewpoint video directly. Techniques used to generate a 3D geometry include structure from motion, shape-from-silhouette, visual hull reconstruction, shape from focus or defocus, structure from stereo and depth/disparity estimation algorithms. The image-based rendering methods are based on sampling pixel data from a set of cameras of know geometric arrangement and combining this information, into a synthesised frame. In addition to sample based rendering of the requested frame, the computational video processing unit may also perform synthesis, 3D modelling, in-painting or interpolation of regions as required covering sampling deficiencies and creating frames of high quality visual appearance. Video streams from the viewpoint 190 created by the computational video processing unit 1105 may subsequently be provided to the production desk (not depicted) where the video streams can be edited together to form a broadcast video.

The cameras 120A to 120X can be an image capture device suitable for capturing video frames from which virtual camera footage can be synthesized, and capable of transmitting video via the connection 1121. For example, the cameras 120A to 120X may be digital video cameras.

Figure 11A:
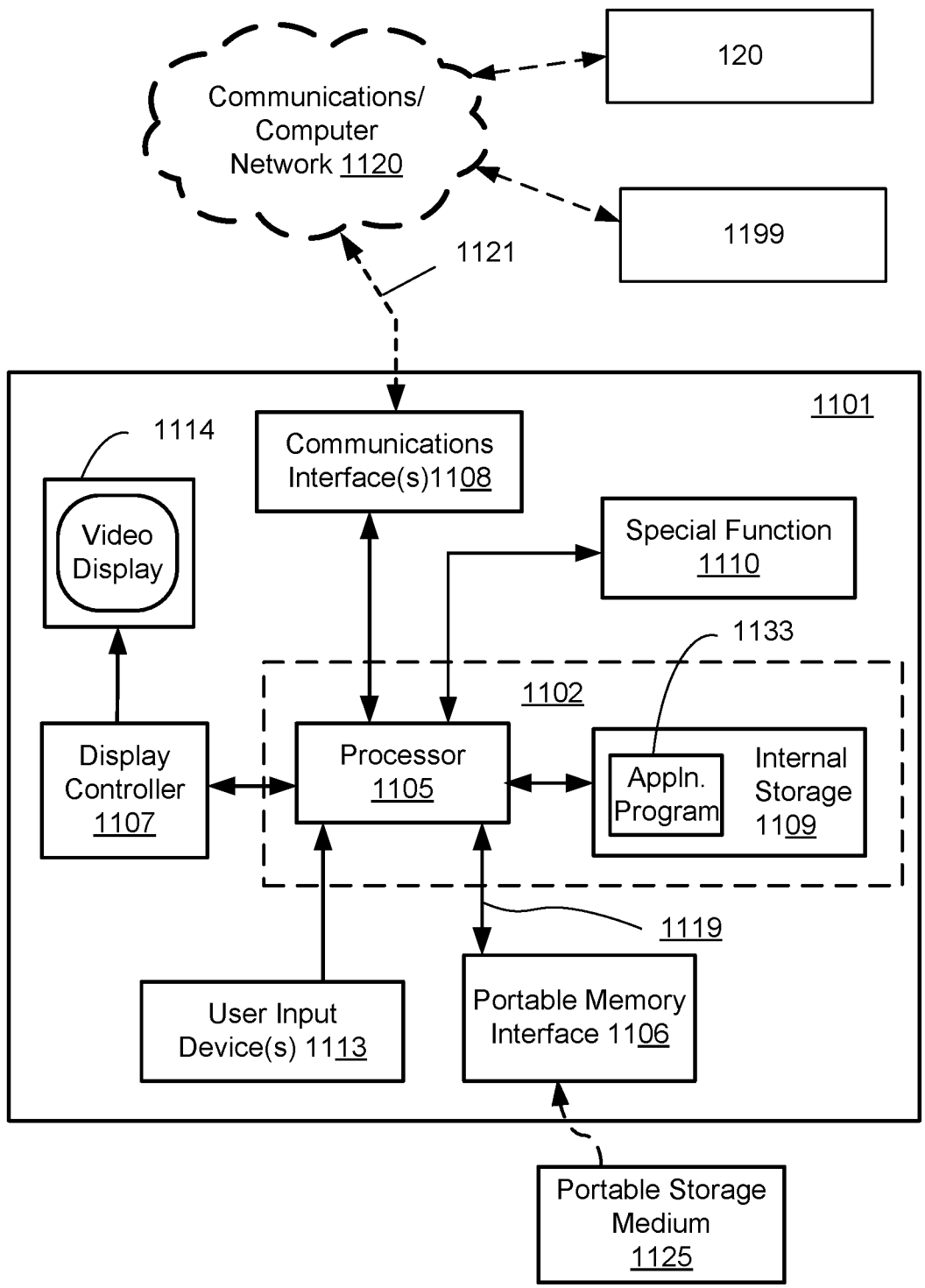
FIGS. 11A and 11B collectively form a schematic block diagram representation of an electronic device upon which described arrangements can be practised
Figure 11B:
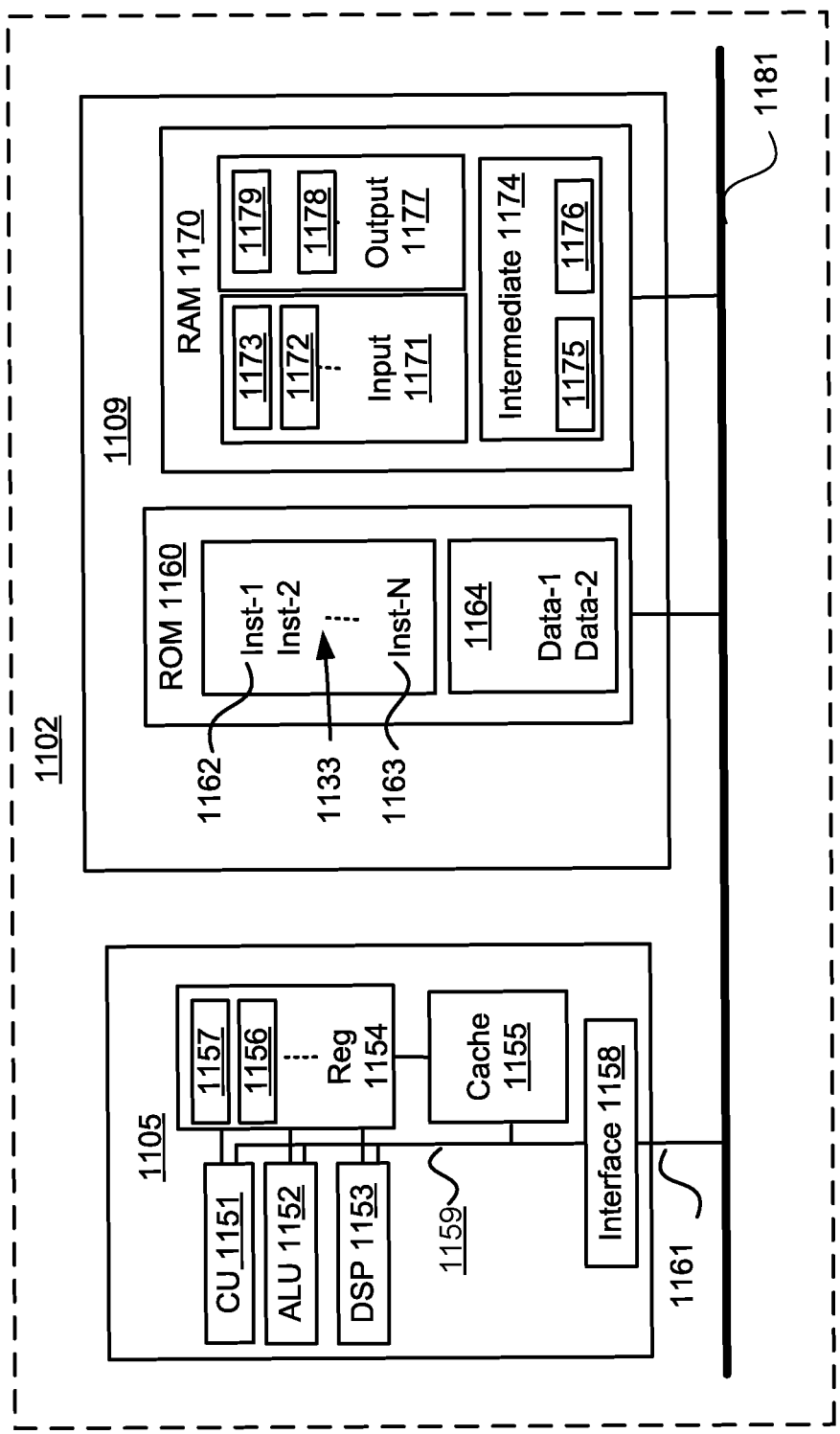

FIGS. 11A and 11B collectively form a schematic block diagram of a general purpose electronic device 1101 including embedded components, upon which the methods to be described are desirably practiced. The electronic device 1101 is preferably a device suitable for viewing and editing video footage such as a tablet. The electronic device 1101 may also be, for example, a mobile phone, or a portable media player, in which processing resources are limited. Nevertheless, the methods to be described may also be performed on higher-level devices such as desktop computers, server computers, and other such devices with significantly larger processing resources.

As seen in FIG. 11A, the electronic device 1101 comprises an embedded controller 1102. Accordingly, the electronic device 1101 may be referred to as an "embedded device." In the present example, the controller 1102 has the processing unit (or processor) 1105 which is bi-directionally coupled to an internal storage module 1109. The storage module 1109 may be formed from non-volatile semiconductor read only memory (ROM) 1160 and semiconductor random access memory (RAM) 1170, as seen in FIG. 11B. The RAM 1170 may be volatile, non-volatile or a combination of volatile and non-volatile memory.

The electronic device 1101 includes a display controller 1107, which is connected to a video display 1114, such as a liquid crystal display (LCD) panel or the like. The display controller 1107 is configured for displaying graphical images on the video display 1114 in accordance with instructions received from the embedded controller 1102, to which the display controller 1107 is connected.

The electronic device 1101 also includes user input devices 1113 which are typically formed by keys, a keypad or like controls. In some implementations, the user input devices 1113 may include a touch sensitive panel physically associated with the display 1114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick, thumb wheel or game pad (not illustrated) for ease of navigation about menus. User input for controlling a virtual camera may be received via the input devices 1113, typically via the touch-screen 1114 if the device 1101 is a tablet computer.

As seen in FIG. 11A, the electronic device 1101 also comprises a portable memory interface 1106, which is coupled to the processor 1105 via a connection 1119. The portable memory interface 1106 allows a complementary portable memory device 1125 to be coupled to the electronic device 1101 to act as a source or destination of data or to supplement the internal storage module 1109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1101 also has a communications interface 1108 to permit coupling of the device 1101 to a computer or communications network 1120 via a connection 1121. The connection 1121 may be wired or wireless. For example, the connection 1121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like. The device 1101 can receive captured video frames and/or video data directly from the cameras 120A to 120X via the connection 1121. Alternatively, the video frames and/or data may be received from remote storage via the connection 1321, for example from a server 1199.

Typically, the electronic device 1101 is configured to perform some special function. The embedded controller 1102, possibly in conjunction with further special function components 1110, is provided to perform that special function. For example, where the device 1101 is a tablet, the components 1110 may represent pressure pad or other functions associated with the touchscreen. The special function components 1110 is connected to the embedded controller 1102. As another example, the device 1101 may be a mobile telephone handset. In this instance, the components 1110 may represent those components required for communications in a cellular telephone environment. Where the device 1101 is a portable device, the special function components 1110 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 1102, where the processes of FIGS. 6 to 12 and 14 may be implemented as one or more software application programs 1133 executable within the embedded controller 1102. The electronic device 1101 of FIG. 11A implements the described methods. In particular, with reference to FIG. 11B, the steps of the described methods are effected by instructions in the software 1133 that are carried out within the controller 1102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1133 of the embedded controller 1102 is typically stored in the non-volatile ROM 1160 of the internal storage module 1109. The software 1133 stored in the ROM 1160 can be updated when required from a computer readable medium. The software 1133 can be loaded into and executed by the processor 1105. In some instances, the processor 1105 may execute software instructions that are located in RAM 1170. Software instructions may be loaded into the RAM 1170 by the processor 1105 initiating a copy of one or more code modules from ROM 1160 into RAM 1170. Alternatively, the software instructions of one or more code modules may be pre-installed in a non-volatile region of RAM 1170 by a manufacturer. After one or more code modules have been located in RAM 1170, the processor 1105 may execute software instructions of the one or more code modules.

The application program 1133 is typically pre-installed and stored in the ROM 1160 by a manufacturer, prior to distribution of the electronic device 1101. However, in some instances, the application programs 1133 may be supplied to the user encoded on one or more CD-ROM (not shown) and read via the portable memory interface 1106 of FIG. 11A prior to storage in the internal storage module 1109 or in the portable memory 1125. In another alternative, the software application program 1133 may be read by the processor 1105 from the network 1120, or loaded into the controller 1102 or the portable storage medium 1125 from other computer readable media. Computer readable storage media refers to any non-transitory tangible storage medium that participates in providing instructions and/or data to the controller 1102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1101. Examples of transitory or non-tangible computer readable transmission media that may also participate in the provision of software, application programs, instructions and/or data to the device 1101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1133 and the corresponding code modules mentioned above may be executed to implement one or more graphical user interfaces (GUIs) to be rendered or otherwise represented upon the display 1114 of FIG. 11A. Through manipulation of the user input device 1113 (or the touch screen 1114), a user of the device 1101 and the application programs 1133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 11B illustrates in detail the embedded controller 1102 having the processor 1105 for executing the application programs 1133 and the internal storage 1109. The internal storage 1109 comprises read only memory (ROM) 1160 and random access memory (RAM) 1170. The processor 1105 is able to execute the application programs 1133 stored in one or both of the connected memories 1160 and 1170. When the electronic device 1101 is initially powered up, a system program resident in the ROM 1160 is executed. The application program 1133 permanently stored in the ROM 1160 is sometimes referred to as "firmware". Execution of the firmware by the processor 1105 may fulfil various functions, including processor management, memory management, device management, storage management and user interface.

The processor 1105 typically includes a number of functional modules including a control unit (CU) 1151, an arithmetic logic unit (ALU) 1152, a digital signal processor (DSP) 1153 and a local or internal memory comprising a set of registers 1154 which typically contain atomic data elements 1156, 1157, along with internal buffer or cache memory 1155. One or more internal buses 1159 interconnect these functional modules. The processor 1105 typically also has one or more interfaces 1158 for communicating with external devices via system bus 1181, using a connection 1161.

The application program 1133 includes a sequence of instructions 1162 through to 1163 that may include conditional branch and loop instructions. The program 1133 may also include data, which is used in execution of the program 1133. This data may be stored as part of the instruction or in a separate location 1164 within the ROM 1160 or RAM 1170.

In general, the processor 1105 is given a set of instructions, which are executed therein. This set of instructions may be organised into blocks, which perform specific tasks or handle specific events that occur in the electronic device 1101. Typically, the application program 1133 waits for events and subsequently executes the block of code associated with that event. Events may be triggered in response to input from a user, via the user input devices 1113 of FIG. 11A, as detected by the processor 1105. Events may also be triggered in response to other sensors and interfaces in the electronic device 1101.

The execution of a set of the instructions may require numeric variables to be read and modified. Such numeric variables are stored in the RAM 1170. The disclosed method uses input variables 1171 that are stored in known locations 1172, 1173 in the memory 1170. The input variables 1171 are processed to produce output variables 1177 that are stored in known locations 1178, 1179 in the memory 1170. Intermediate variables 1174 may be stored in additional memory locations in locations 1175, 1176 of the memory 1170. Alternatively, some intermediate variables may only exist in the registers 1154 of the processor 1105.

The execution of a sequence of instructions is achieved in the processor 1105 by repeated application of a fetch-execute cycle. The control unit 1151 of the processor 1105 maintains a register called the program counter, which contains the address in ROM 1160 or RAM 1170 of the next instruction to be executed. At the start of the fetch execute cycle, the contents of the memory address indexed by the program counter is loaded into the control unit 1151. The instruction thus loaded controls the subsequent operation of the processor 1105, causing for example, data to be loaded from ROM memory 1160 into processor registers 1154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

In the arrangements described, a user typically performs functions related to determining a virtual camera path, control the virtual camera using the input 1113. Alternatively, the user may control the virtual camera 150 using the controller 180, which operates in a similar manner to the module 1101.

The approach of the arrangements described operates to address the efficiency of inserting a camera path into a virtual environment by simplifying the user requirements for positioning, orientating, scaling and adjusting the time of a camera path in relation to events of the virtual environment. As described above, the user adjusting the position, orientation, and scale of the inserted camera path is problematic. However, using the arrangements described herein, the user is required to only configure an action path through the virtual environment and then select a camera path template to insert. Through a series of steps, the application 1133 executes to modify the camera path of the camera path template to align the action path.

Figure 2:
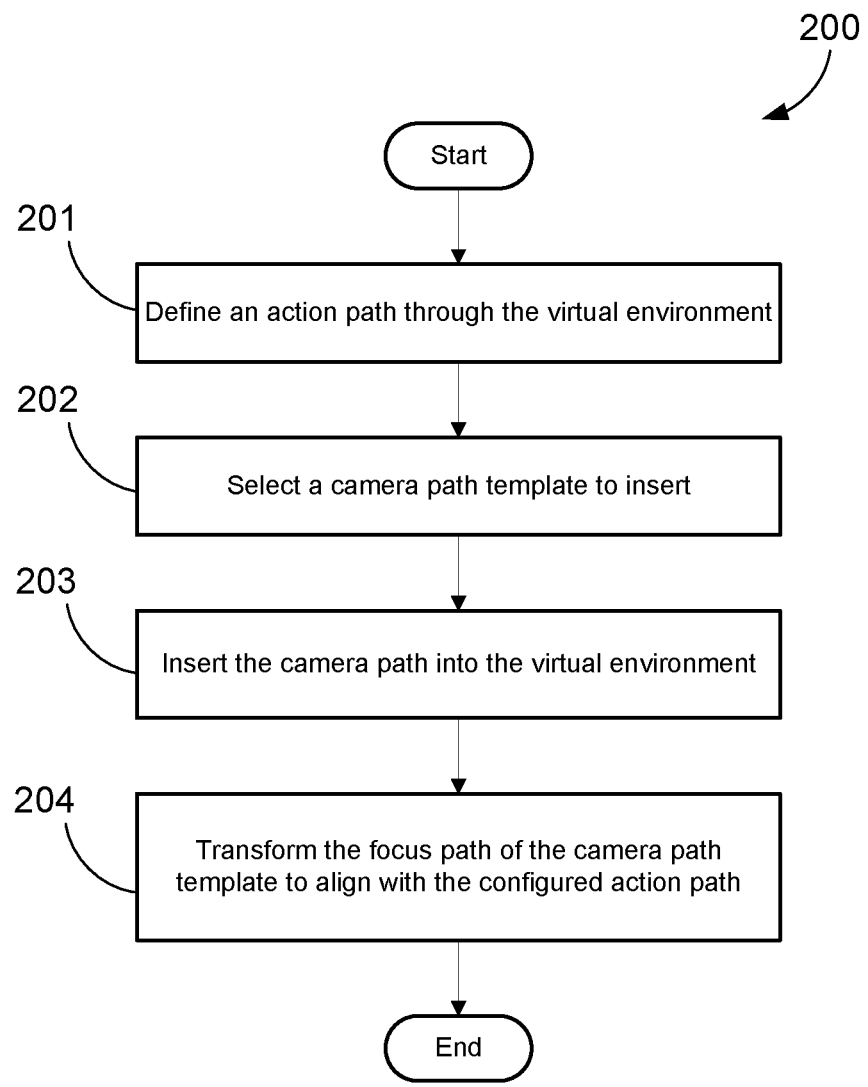
FIG. 2 is a flowchart of a method of determining a path of a virtual camera.

FIG. 2 shows a method 200 of determining a virtual camera path. The method 200 is typically implemented as one or more modules of the application 1133, stored in the memory 1109 and controlled under execution of the processor 1105.

The method 200 starts at a determining step 201. The step 201 executes to determine an action path in the three-dimensional video data of the scene. In one implementation at step 201 the module 1101 reproduces video footage of the scene 110 on a display, for example the display 1114. The implementation requires the user to configure an action path through the virtual environment. The action path may be configured by a graphical user interface associated with the display of the video footage receiving the user selection of three-dimensional points or locations in the video data, for example by manipulation of one of the inputs 1113 or the touchscreen 1114. The action path is a constructed line through the virtual environment synthesized using image data captured by the cameras 120A to 120X. The action path signifies the trajectory and timing of an event that the user intends to record with the virtual camera 150. The user considers the spatial and temporal movements of the target objects in the virtual environment and constructs the action path through the central axis of where the action occurred on the field. In one arrangement, the user configures the action path by defining two (three-dimensional) points in the video data.

Each point defined by the user specifies a spatial reference point and a temporal reference point in the video data of the scene. The first point defined by the user marks a three-dimensional spatial position (within the scene) and a temporal reference associated with a beginning of the event. The second point defined marks a three-dimensional spatial position (within the scene) and a temporal reference associated with a conclusion of the event from appoint of view of the user. By using two points to define the action path, step 201 calls for a low amount of effort on the user's part. To perform the task of defining points the user requires user input means which allows the user to specify a spatial coordinate, and the means to navigate the timeline of a scene. For a user to perform these task, either hardware or software controls can be used. The arrangements described can use different types of input devices for user to define the points. For example, each point may be defined by the user interacting with a graphical user interface by selecting a location of the touchscreen 1114 showing an object or location in the scene, or by using an input such as a game pad to select the location.

An alternative method of defining the action path at step 201 allows the user to define multiple three-dimensional points in the video data during a timespan of event to be recorded. The user can mark a position of a target in the scene for at least two different time values for example. Each point (marking a time and spatial position) correlates to a position of a significant target object participating on the event to be recorded. Using the multiple points selected (defined), the application 1133 can determine a speed characteristic of the target object through the virtual environment. The speed characteristic is useful to recognise as target objects typically do not move at a constant velocity. Determining the speed of an object instructs the application 1133 where along the trajectory the object is located and where in the scene the virtual camera should be capturing. After the user specifies the multiple points, the application 1133 uses the multiple points to generate a line of best fit between all the points. The generated line of best fit becomes the action path. In the arrangements described, the action path comprises a straight line. In other implementations, the action path can comprise a line forming an open curve having a degree of curvature generated by interpolating a cubic spline between the multiple points.

Another alternate method of defining the action path at step includes using a tracking algorithm. The tracking algorithm can be based on data obtained from one or more sources. The sources may be direct and/or indirect. Direct sources of data include data obtained by devices physically worn by the targets (objects of interest) in the scene. The devices typically utilise global positioning system (GPS) or radio frequency identification (RFID) technologies to transmit data, revealing the position of the target objects in the environment. Indirect sources of data include data obtained from image based tracking methods analysing the video data. An example image based tracking method analyses the footage of the physical cameras 120A to 120X capturing the scene 110, and performs object recognition to identify the possible target objects. Once potential target objects are identified, the positions of the potential target objects are recorded in each frame captured by each physical camera containing the objects. Using the views from other physical cameras a 3D spatial position can be determined by execution of the application 1133. After the tracking algorithm is instructed on which target object to track, a series of points are generated defining the position and timing of the objects movement through the environment. Execution of the tracking algorithm accordingly determines a position of a target in the scene for at least two different time values. The application 11333 uses the multiple points to generate a line of best fit between all the points. The generated line of best fit is used as the action path.

Configuring the action path operates to supply spatial and temporal information about which objects or areas in the environment 110 should be captured by the virtual camera.

Figure 3:
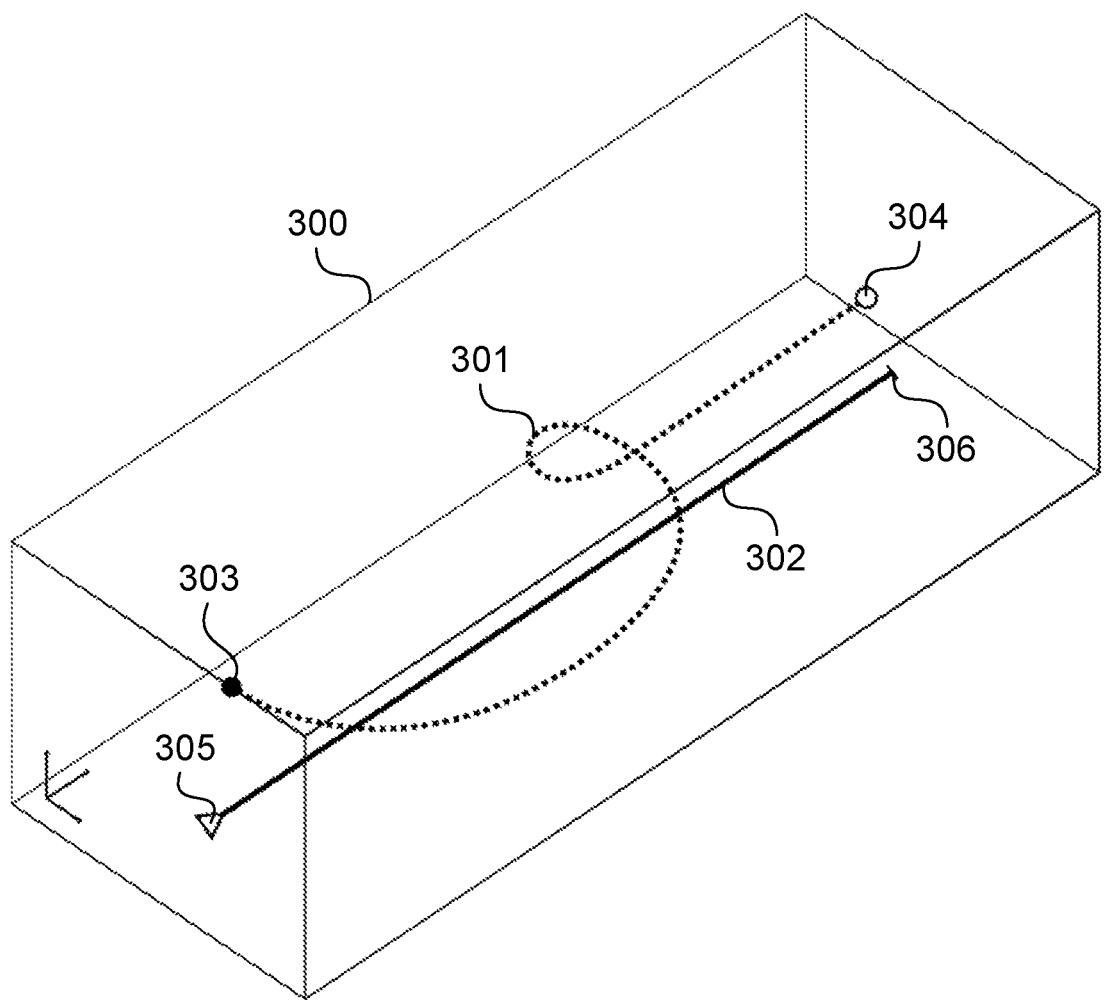
FIG. 3 shows an illustration of a camera path template.

The method 200 continues from step 201 to a selecting step 202. At step 202, the user selects a camera path template to insert into the virtual environment. The device 1101 can receive the user selection via the graphical user interface reproducing the video footage for example. FIG. 3 shows an example camera path template 300. The template camera path 300 includes information defining a template camera path with respect to an associated template focus path. As shown in FIG. 3, the camera path template 300 comprises a virtual camera path 301 and a focus path 302. The camera path 301 is the path which the virtual camera (150) moves along. The camera path 301 is defined by a series of camera positional values (X, Y, Z), camera orientation coordinates (pan, tilt, roll, zoom), and camera time coordinates. The time coordinate values can be combined with the positional values to provide camera speed values. The virtual camera on the camera path 301 has a start position 303 and an end position 304. The virtual camera need not travel at a constant velocity along the camera path 301.

The focus path 302 is a line associated with the camera path 301. The focus path has a beginning 305 and an end 306. The association of the focus path 302 with the camera path 301 is authored by the creator of the camera path template 300. In the context of the arrangements described, a focus path represents a geometric region of focus of the virtual camera and where the region of focus moves over time. The focus path effectively comprises a set of coordinates and an associated direction representing a best fit tracking movement of an object of interest (target) in the scene. The focus path is created to correlate to where a target object is expected to be in relation the camera path. The template camera path is associated with the focus path in that a virtual camera following the template camera path is configured to have a field of view capturing a location on the focus path.

The focus path can also comprise a speed characteristic which defines the speed of the region of focus as the target object moves along the focus path. The speed characteristic of the focus path is correlated to the speed characteristic of the camera path along the camera path. The example template 300 illustrates the focus path 302 running through the center of the camera path 301. However, the focus path 302 can have any spatial and temporal relation to the camera path 301 that is likely to allow the target object to be captured in the scene.

The method 200 continues from step 202 to an insertion step 203. At execution of the step 203 the application 1133 inserts the selected camera path template into the virtual environment. Initially the application 1133 inserts the camera path template into a default position. An example of a default position is a point of origin of the virtual environment.

The method 200 continues from step 203 to a transforming step 204. Step 204 effectively operates to transforming the template camera path based on alignment between the template focus path and the action path to determine the virtual camera path. In execution of step 204, the application 1133 executes to transform the focus path component 302 of the camera path template 300 to align the focus path with the configured action path. In transforming the focus path, the application 1133 modifies the position and time values of the beginning and end points (305 and 306) so that the beginning and ending points of the focus path 302 coincide with the beginning and end of the action path 301. Operation of step 204 accordingly aligns the position, orientation, scale and timespan of both paths 301 and 302. The step 204 further executes synthesize (generate) video frames capturing the scene from the transformed virtual camera path and reproduce the captured video on the display 1114. The generated video corresponds to a virtual camera view along the transformed virtual camera path.

Alignment of the template focus path to the action path can operate to scale the camera path, for example lengthening or shortening the camera path. Similarly, alignment of the template focus path to the action path can operate to modify orientation of the virtual camera. If a speed characteristic is associated with the action path, the alignment may correspondingly modify a speed characteristic of the focus path. The camera path 301 has a fixed relationship with the focus path 302, as modifications to the focus path 302 have equal effect to the position, orientation and scale values of the camera path.

In an implementation where the action path is defined by a method utilising multiple defined points, a speed characteristic of the target object along the action path is determined. The application 1133 can also execute to modify the speed characteristic of the focus path to match the speed characteristic of the action path Timing of the virtual camera 150 along the camera path is adjusted accordingly.

A result of modifying the focus path to align with the action path is that the camera path is in some instances overly modified to suitably capture the event originally instructed by the user creating the action path. To better orientate the virtual camera to capture the target object of the event, the application 1133 is capable of modifying the orientation of the camera independent of the position of the camera by reorientating the virtual camera. To reorientate the camera, the application 1133 references the series of multiple defined points, marking the positions of the target object over time. While the application 1133 modifies the positional movement of the camera on the camera path based on the determined matching of the focus path with the action path, orientation of the virtual camera is modified to capture the multiple defined points (indicating the position of the target object); and intermediary positions between the points.

If the action path relates to a curve, the application 1133 executes to match the beginning of the focus path to the beginning of the curve and the endpoint of the focus path to the endpoint of the curve. Additionally, a midpoint of the template focus path is matched to a midpoint of the curve. Further, or alternatively, a predetermined number of locations or points of the template focus path can be matched to a corresponding number of points on the curve.

Following execution of step 204, the method 200 ends.

Figure 4:
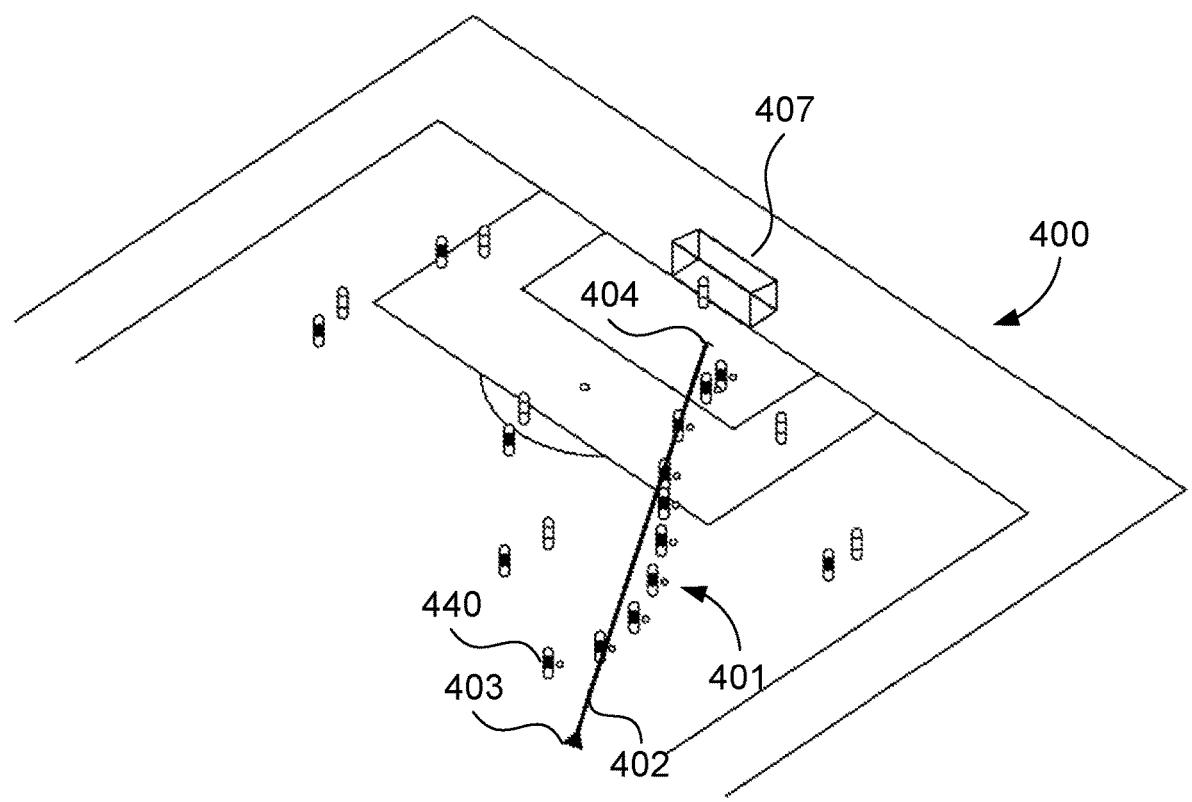
FIG. 4 shows an illustration of an action path in a virtual environment.

The method 200 is now described with reference to an example scenario. FIG. 4 shows an example virtual environment 400. The virtual environment 400 represent a portion of the scene 110 reproduced on the display 1114. In execution of the step 201 the user configures an action path in the environment 400. In the example of FIG. 4, the virtual environment 400 is a scene of a soccer game. An event 401 intended to be captured by the user is of a player dribbling a ball towards a goal 407. For illustration purposes, an illustration 440 showing a position of the player and ball is repeated to communicate to the reader the full trajectory of the player's movement.

To capture the event 401, the user creates an action path 402 in accordance with step 201. The user uses an input device (for example the input 1113) to navigate the scene's timeline via a graphical user interface (not shown) to the point in time of start of the event. The user specifies a beginning point 403, marking a starting position of the event 401. The user navigates the timeline to the end of the event 401. The user specifies an ending point 404, marking the ending position of the event 401. By specifying the beginning point 403 and ending point 404, the action path 402 is defined. After defining the action path 402, the user, as part of step 202, selects a camera path template to insert into the virtual environment.

Figure 5:
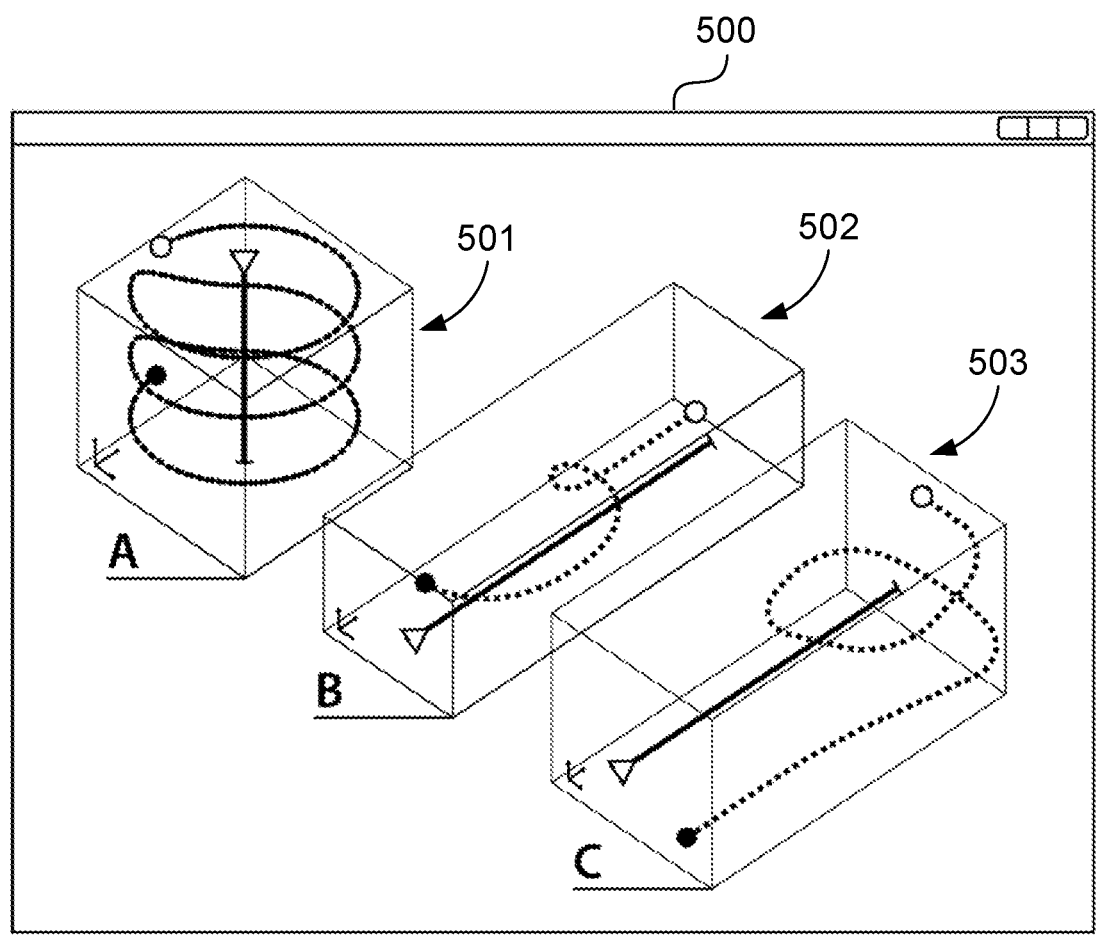
FIG. 5 shows an example graphical user interface displaying multiple camera path templates for selection.

FIG. 5 illustrates an example of a user interface with multiple camera path templates for selection. The user is presented a GUI window 500 presenting three different camera path templates, A 501, B 502, and C 503. Each of the templates 501, 502 and 503 includes a focus path shown using a continuous line and a camera path shown using a dashed line. In the example described herein, the user selects template B 502 to insert into the virtual environment.

Figure 6:
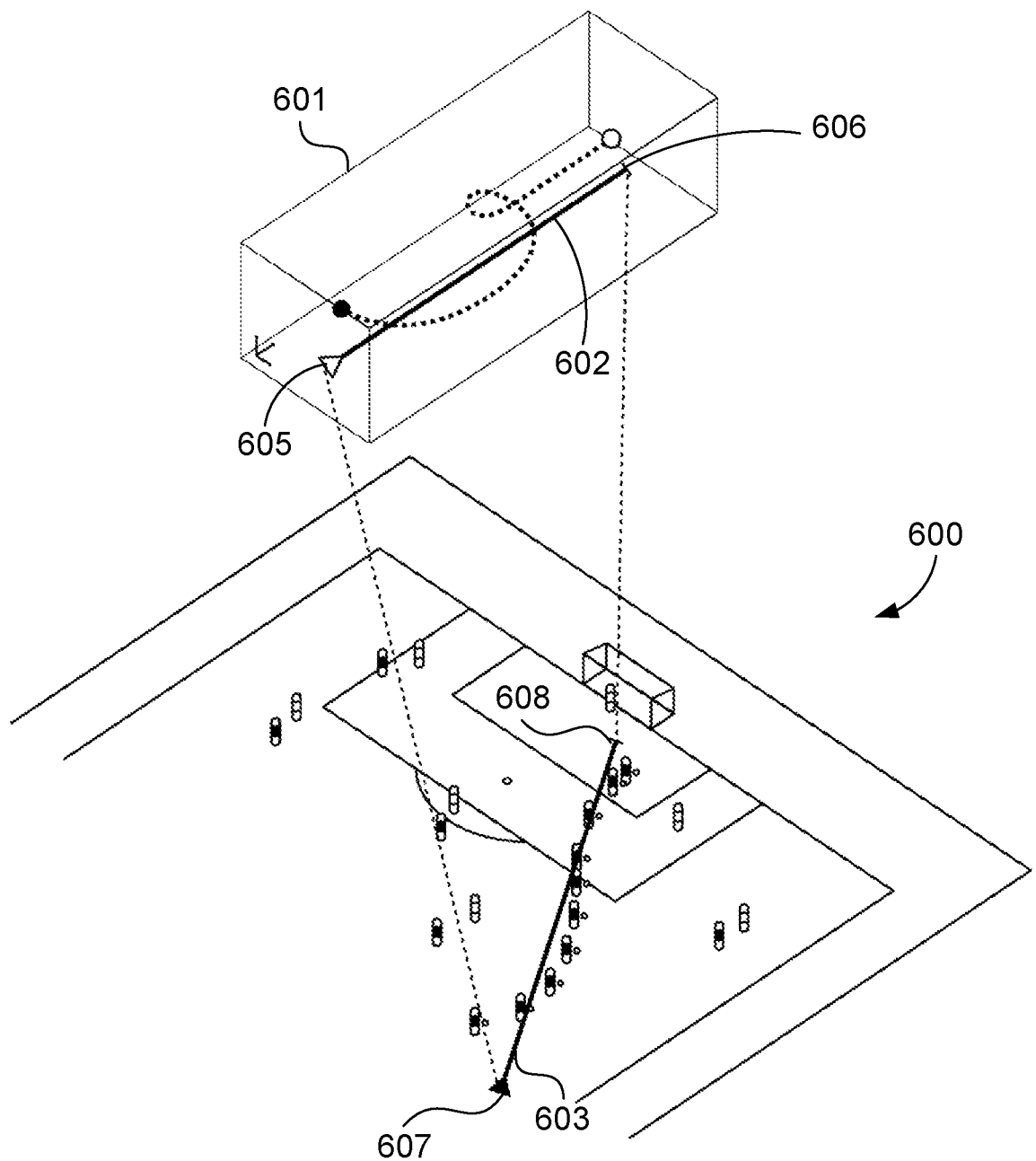
FIG. 6 shows an example of a path template inserted into a virtual environment.

FIG. 6 illustrates operation of step 203 where the application inserts a selected camera path template 601 (corresponding to the template 502) into a virtual environment 600 (corresponding to the environment 400). Step 204 executes so that the application 1133 transforms a focus path 602 to align with an action path 603 configured at step 201. The action path 603 corresponds to the action path 402. The application 1133 executes to insert the selected camera path template 601 into the virtual environment 600 at a default position, for example at a first or last position of interaction received from the user. The application 1133 executes to perform step 204 and transform the focus path 602 of the camera path template 601 to align with the action path 603. To align the focus path 602 with the action path 604 the application modifies the position and time values of a beginning point 605 of the focus path 602 to be the same as the position and time values of a beginning point 607 of the action path 603. The application 1133 executes to modify the position and time values of an end point 606 of the focus path 602 to be the same as the position and time values of an end point 608 of the action path 603.

Figure 7:
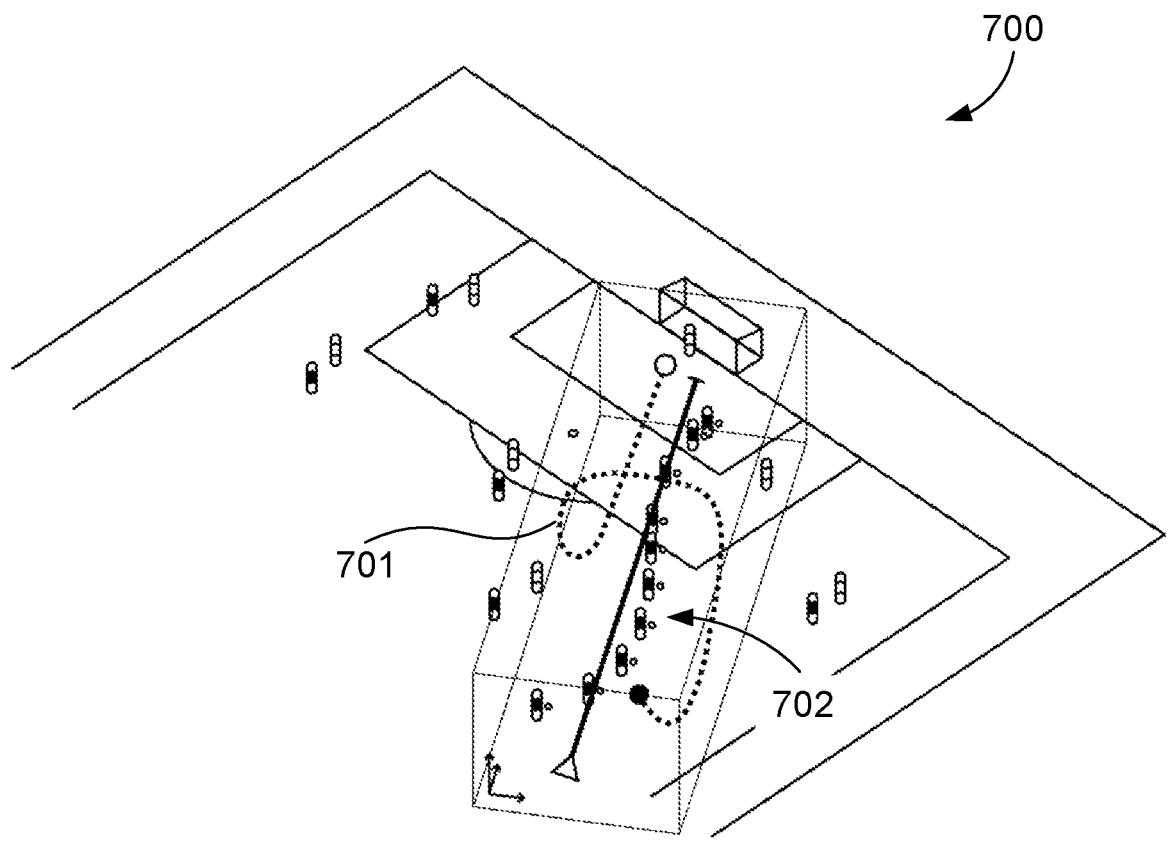
FIG. 7 shows a camera path template after modification with reference to a virtual environment.

FIG. 7 shows a result of execution of step 204 and a corresponding conclusion of the method 200. A scene 700 of FIG. 7 corresponds to the scene 600 of FIG. 6. A transformed template 701 corresponds to the template 601 after execution of step 204. The result of the application transforming the camera template 601 and modifying the values of the focus path 602 is that a modified camera path 701 is generated by which the virtual camera 150 can capture event 702 (corresponding to the event 401).

Figure 8:
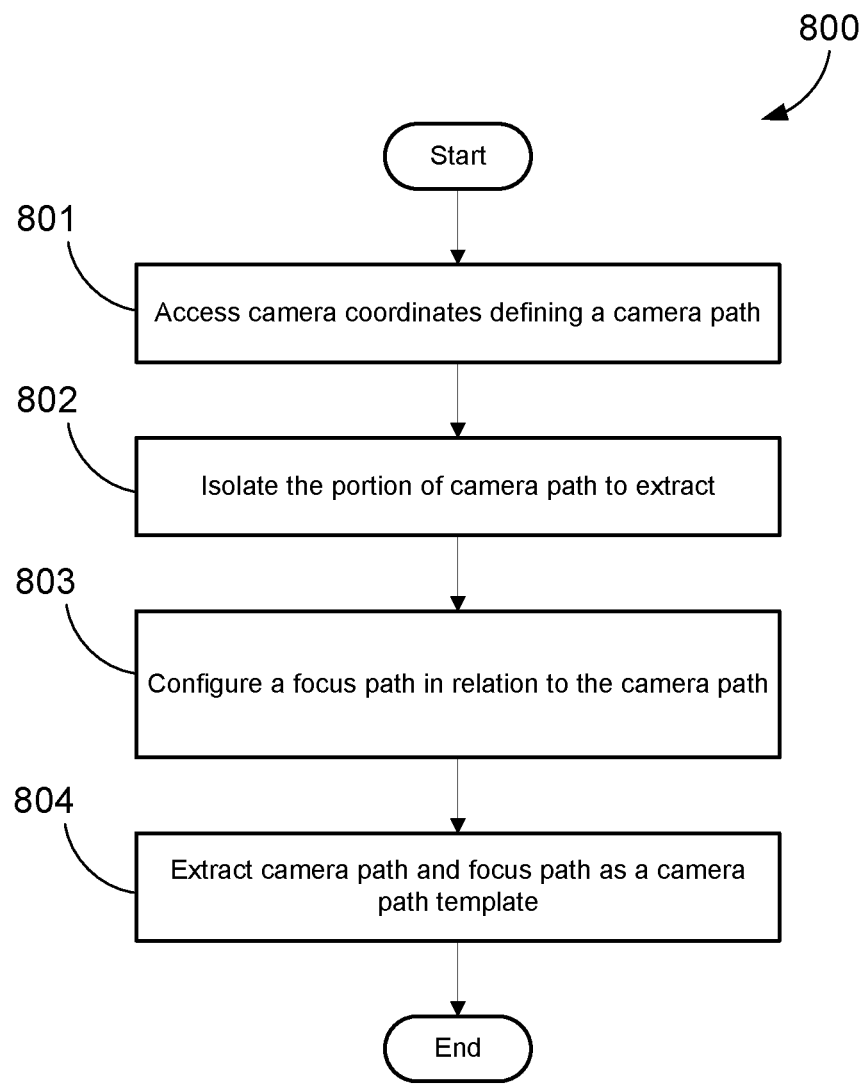
FIG. 8 shows a method of creating a camera path template.

FIG. 8 shows a method 800 of creating a camera path template for use as part of the method 200 of FIG. 2. The method 800 is typically implemented as one or more modules of the application 1133, stored in the memory 1109 and controlled under execution of the processor 1105.

FIGS. 9A, 9B, 10, and 11 provide an example of operation of the steps of method 800. The method 800 starts at an accessing step 801. Step 804 executes to access camera coordinates defining a camera path. The application 1133 accesses camera coordinates by accessing historical data of a previous event where a user generated a virtual camera path. The camera coordinates may be stored in association with the event or the virtual camera for example. The application 1133 can additionally or alternatively access camera coordinates from other sources. For example, the application could access camera coordinates generated by a camera path authoring software application such as Autodesk 3DS MAX.

Figure 9A:
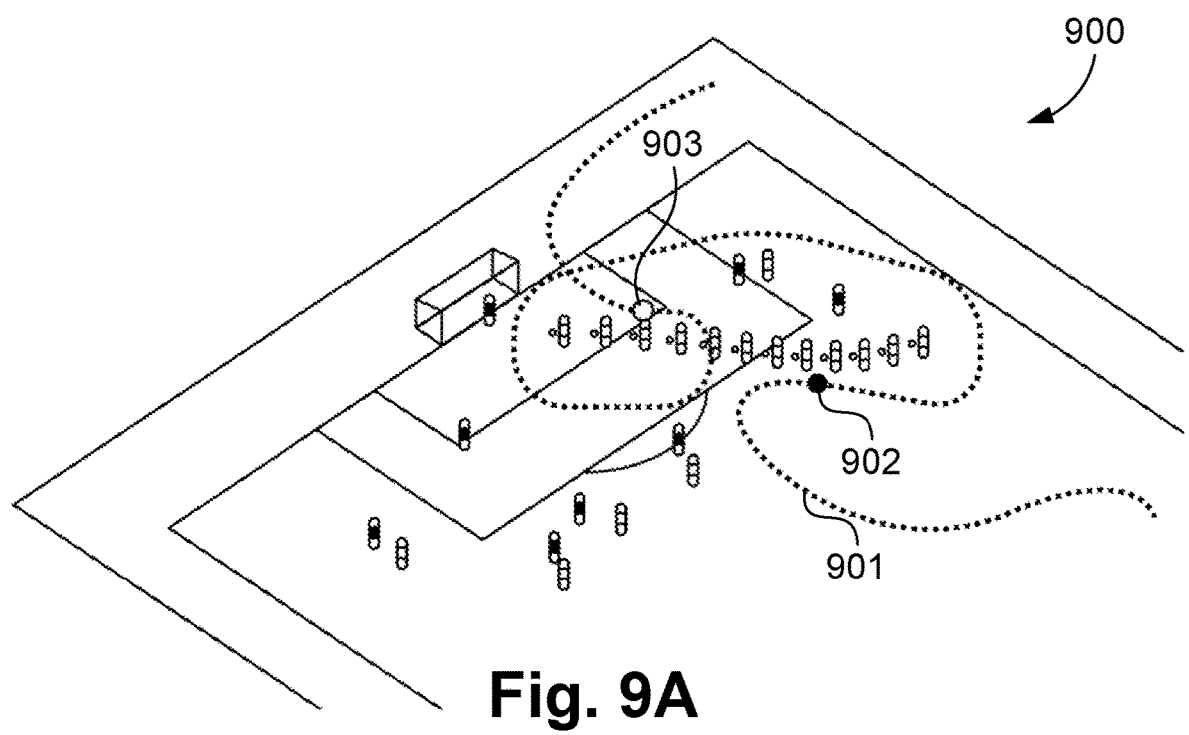
FIGS. 9A and 9B show illustrations of a camera path to be extracted.

FIG. 9A is an illustration of an example virtual environment 900. The virtual environment 900 is synthesized from three-dimensional video data collected by the cameras 120A to 120X. The virtual environment 900 contains an existing camera path 901 to be extracted. The camera path 901 comprises a series of camera coordinates over time.

The method 800 proceeds from step 801 to an isolating step 802. At execution of step 802 a portion of the camera coordinates are extracted (isolated) to become the camera path of the camera path template. The step 802 can use similar methods to those described for defining an action path in step 201 of FIG. 2. In isolating the camera coordinates the user can manually defines the beginning and end values for the camera path. Alternatively, the application 1133 can execute to define beginning and end values for the camera path. In one example, the user manually defines the beginning and end values of the camera path using a GUI, for example by selecting points associated with an event. In another example, the application 1133 can define the beginning or the end points of a camera path based on an analysis of the event for which the camera path was originally recorded and determining camera coordinates which capture the event. For example, tracking data associated with object and a tracking algorithm can be used to determine start and ends time. The application 1133 can additionally or alternatively use a trained classifier to detect occurrence of an event such as scoring a goal, passing a ball, or the like. In FIG. 9A, the portion of the camera path 901 to be extracted (isolated) is defined by a beginning point 902, and an end point 903.

The method 800 proceeds from step 802 to a configuring step 803. In execution of step 803, a focus path is configured in relation to the isolated camera path. Either the user or the application 1133 defines the focus path. In one example, the user observes the event and movement of the field of view of the virtual camera and manually determines the position and orientation of the focus path. For example, the user may manipulate a graphical user interface (not shown) at step 803 to select the position and orientation of the focus path. The user then configures the focus path by specifying a focus path beginning point 907, followed by a focus path ending point 908 as show in FIG. 9B. In some implementations, the user may provide a number of points between the beginning point 907 and the ending point 908. In another example, the application 1133 executes to determine the focus path. In one implementation, the step 803 executes a tracking algorithm described in relation to step 201 to determine an action path. The tracking algorithm is used as, or to determine, the focus path.

Figure 9B:
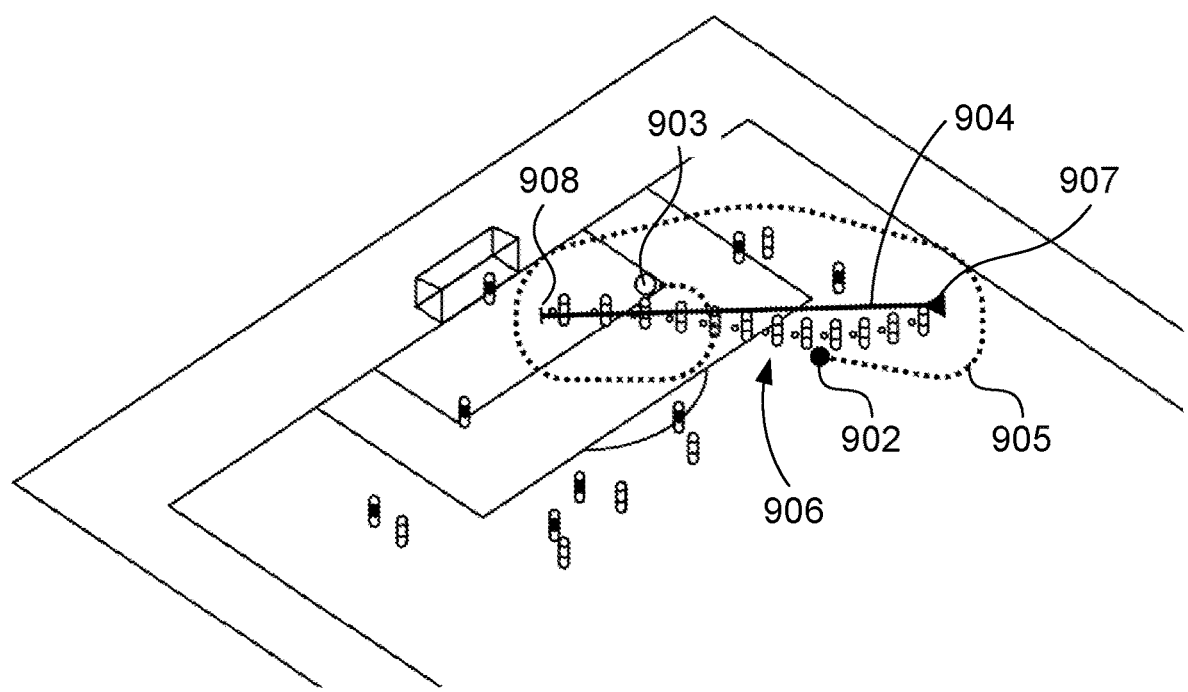

In FIG. 9B, a focus path 904 is defined in relation to an event 906 captured by a portion of camera path 905 where the timing values of the beginning of the focus path 907 is the same as the start of the camera path 902. Similarly, the timing of the ending of the focus path 908 is the same as the ending of the camera path 903.

Figure 10:
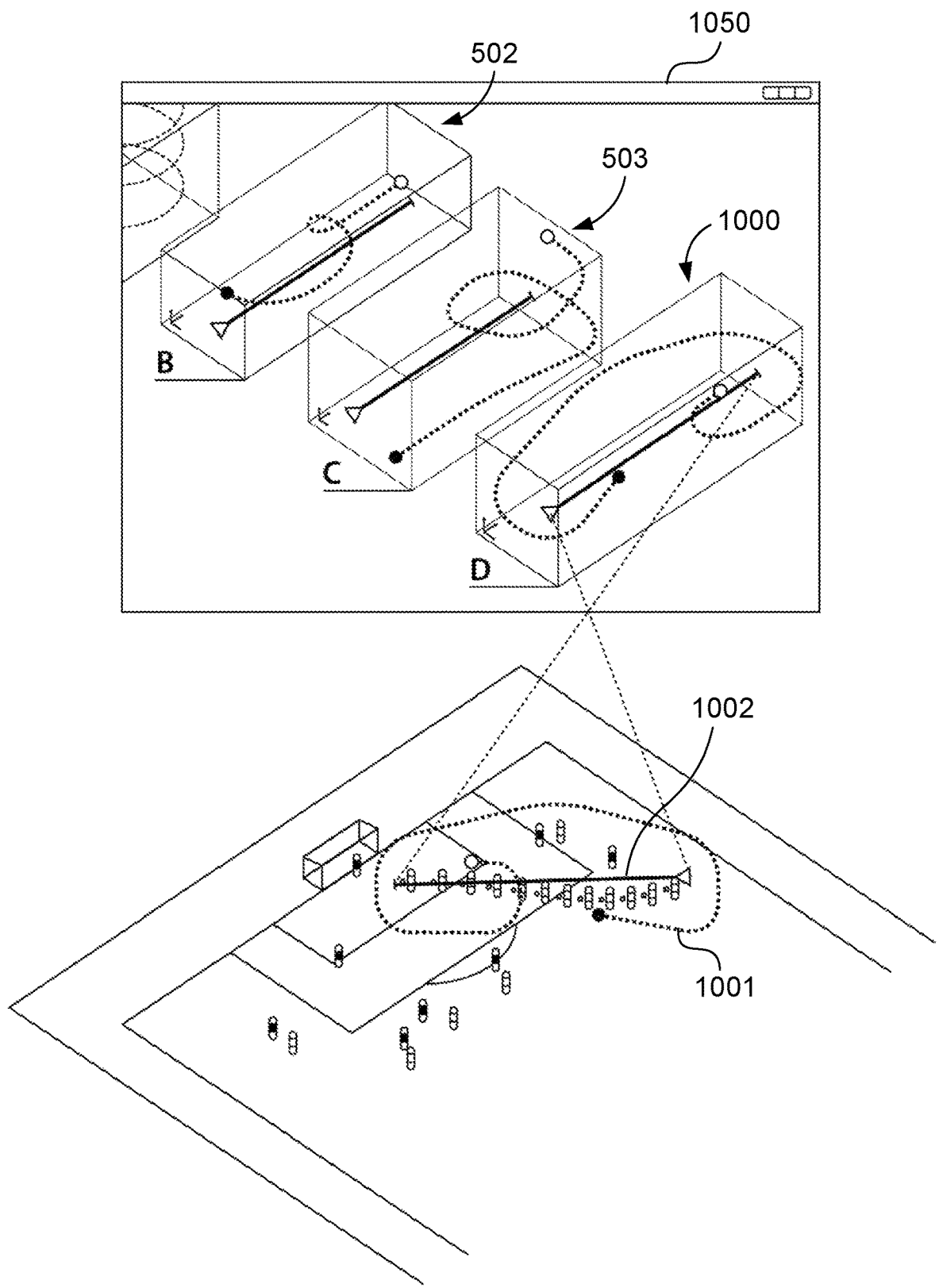
FIG. 10 shows an illustration of the application creating a camera path template.

The method 800 proceeds from step 803 to an extracting step 804. In execution of step 804 the camera path and focus path are extracted as a camera path template. FIG. 10 illustrates the application 1133 extracting a camera path 1001 and a focus path 1002 into a generalised camera path template 1000. The generalised camera template is stored in the memory 1109 added to display of a GUI window 1050. The GUI window 1050 includes the templates 502 and 503 shown in FIG. 5.

The arrangements described are applicable to the image processing industries and particularly for the video capture and replay industries.

Using a focus path can allow multiple parameters of a scene to be summarised so that video containing an object of interest can be captured. Aligning the focus path to the action path allows improved transformation of the camera path, so that templates can be re-used even if the parameters or events associated with the events differ. Use of the focus path in the arrangements described accordingly improves the likelihood of appropriately capturing an event or target object using a template. By aligning the focus path with an action path, the arrangements described further provide a solution whereby the user operating the virtual camera is not required to be an expert in virtual camera configuration or guidance. Additionally, the time required to generate a suitable replay of an event can be reduced.

The foregoing describes only some embodiments of the present invention, and modifications and/or changes can be made thereto without departing from the scope and spirit of the invention, the embodiments being illustrative and not restrictive.

The claim(s) defining the invention are as follows:

1. An apparatus comprising:
one or more hardware processors; and
one or more memories which store instructions executable by the one or more hardware processors to cause the apparatus to perform at least:
determining a movement template based on user input among a plurality of predetermined movement templates that respectively define different change patterns of a position of a virtual viewpoint relative to a target position toward which the virtual viewpoint is oriented;
specifying a path along which a target position moves in a three dimensional scene; and
setting a transition of a position and an orientations of the virtual viewpoint for generating a virtual viewpoint video representing the three dimensional scene viewed from the virtual viewpoint, such that the virtual viewpoint is oriented toward the target position moving on the specified path and such that the position of the virtual viewpoint changes according to the change pattern defined by the determined movement template relative to the target position moving on the specified path.

2. The apparatus according to claim 1, wherein the path is specified based on user input for marking positions in the scene, wherein the positions correspond to different time values.

3. The apparatus according to claim 1, wherein the path is specified based on detection of a movement path of a target object in the scene.

4. The apparatus according to claim 3, wherein the transition of the position and the orientation of the virtual viewpoint is set such that the virtual viewpoint is oriented toward the target object while the virtual viewpoint moves according to the determined movement template.

5. The apparatus according to claim 1, wherein each of the movement templates further defines a movement path of the target position, and the transition of the position and the orientation of the virtual viewpoint is set by transforming the determined movement template such that the movement path of the target position is aligned with the specified path.

6. The apparatus according to claim 5, wherein transforming the determined movement template comprises modifying orientation of the movement path and scaling the movement path.

7. The apparatus according to claim 1, wherein the specified path is defined by more than two points, each point having a position value and a time value associated with the scene.

8. The apparatus according to claim 1, wherein the specified path is defined by more than two points, each point having a position value and a time value associated with the scene, and a speed characteristic of movement of the target position is matched to a speed characteristic of the specified path, the speed characteristic of the specified path being determined from the more than two points.

9. The apparatus according to claim 8, wherein the movement of the virtual viewpoint is adjusted according to the speed characteristic of the movement of the target position.

10. The apparatus according to claim 1, wherein more than two points are defined in the scene, and the specified path is defined by a line between the points.

11. The apparatus according to claim 5, wherein the movement of the virtual viewpoint is associated with movement of the target position so that modifications to the movement path of the target position are correspondingly applied to the movement of the virtual viewpoint.

12. The apparatus according to claim 1, wherein the user input is input for selecting a movement template from the plurality of predetermined movement templates.

13. The apparatus according to claim 1, wherein coordinates of the virtual viewpoint are defined to capture an object of interest associated with the target position.

14. The apparatus according to claim 1, wherein the virtual viewpoint video corresponding to the virtual viewpoint is generated based on a plurality of videos of the scene captured from different directions by a plurality of image capturing devices.

15. A non-transitory computer readable medium having a computer program stored thereon to implement a method comprising:
   determining a movement template based on user input among a plurality of predetermined movement templates that respectively define different change patterns of a position of a virtual viewpoint relative to a target position toward which the virtual viewpoint is oriented;
   specifying a path along which a target position moves in a three-dimensional scene; and
   setting a transition of a position and an orientation of the virtual viewpoint for generating a virtual viewpoint video representing the three-dimensional scene viewed from the virtual viewpoint, such that the virtual viewpoint is oriented toward the target position moving on the specified path and such that the position of the virtual viewpoint changes according to the change pattern defined by the determined movement template relative to the target position moving on the specified path.

16. A computer-implemented method, comprising:
   determining a movement template based on user input among a plurality of predetermined movement templates that respectively define different change patterns of a position of a virtual viewpoint relative to a target position toward which the virtual viewpoint is oriented;
   specifying a path along which a target position moves in a three-dimensional scene; and
   setting a transition of a position and an orientation of the virtual viewpoint for generating a virtual viewpoint video representing the three dimensional scene viewed from the virtual viewpoint, such that the virtual viewpoint is oriented toward the target position moving on the specified path and such that the position of the virtual viewpoint changes according to the change pattern defined by the determined movement template relative to the target position moving on the specified path.

17. The method according to claim 16, wherein the path is specified based upon user input for marking at least two points in the scene.

18. The method according to claim 16, wherein the path is specified based upon detection of a movement path of an object of interest in the scene.

19. The method according to claim 16, wherein the path is specified based upon detection of an event in the scene.

* * * * *